United States Patent
Silva et al.

(10) Patent No.: US 9,618,829 B2
(45) Date of Patent: Apr. 11, 2017

(54) METHOD AND DEVICE FOR ELEVATING MOBILE DEVICE

(71) Applicant: Stinger Tees, Inc., Warrensville Heights, OH (US)

(72) Inventors: William A. Silva, Greer, SC (US); Michael H. Maness, Greenville, SC (US); Ben S. Corley, Jr., Greenville, SC (US)

(73) Assignee: STINGER TEES, INC., Warrensville Heights, OH (US)

( * ) Notice: Subject to any disclaimer, the term of this patent is extended or adjusted under 35 U.S.C. 154(b) by 110 days.

(21) Appl. No.: 14/383,552

(22) PCT Filed: Mar. 7, 2013

(86) PCT No.: PCT/US2013/029577
§ 371 (c)(1),
(2) Date: Sep. 6, 2014

(87) PCT Pub. No.: WO2013/134494
PCT Pub. Date: Sep. 12, 2013

(65) Prior Publication Data
US 2015/0047173 A1  Feb. 19, 2015

Related U.S. Application Data

(60) Provisional application No. 61/607,786, filed on Mar. 7, 2012.

(51) Int. Cl.
*A47G 29/00* (2006.01)
*G03B 17/56* (2006.01)
(Continued)

(52) U.S. Cl.
CPC .............. *G03B 17/561* (2013.01); *A45F 3/44* (2013.01); *F16B 2/12* (2013.01); *F16B 2/22* (2013.01);
(Continued)

(58) Field of Classification Search
CPC  G03B 17/561; F16B 2/12; F16B 2/22; F16M 11/16; F16M 11/041;
(Continued)

(56) References Cited

U.S. PATENT DOCUMENTS 5,457,745 A * 10/1995 Wang .................. B60R 11/0241
379/426
7,537,190 B2 * 5/2009 Fan ........................ B60R 11/02
248/309.1
(Continued)

OTHER PUBLICATIONS

International Search Report and Written Opinion from corresponding PCT Application No. PCT/US2013/029577, mailed Jun. 27, 2013, 9 pages.

*Primary Examiner* — John C Hong
(74) *Attorney, Agent, or Firm* — Pearne & Gordon LP

(57) ABSTRACT

A method and device for holding an electronic device, such as a suitably-equipped cellular phone, having a video recording feature, or simply a camera, at a desired elevation for filming or photographing. The device includes a frame for holding the electronic device and a vertical support serving as a monopod, such as a golf alignment stick. The frame may be a two-part adjustable frame comprising two interlocking, opposing, L-shaped elements.

27 Claims, 4 Drawing Sheets

(51) Int. Cl.
*H04B 1/38* (2015.01)
*H04N 5/225* (2006.01)
*H04B 1/3877* (2015.01)
*A45F 3/44* (2006.01)
*F16M 13/00* (2006.01)
*F16M 11/04* (2006.01)
*F16M 13/02* (2006.01)
*F16B 2/12* (2006.01)
*F16B 2/22* (2006.01)
*F16M 11/16* (2006.01)
*H04M 1/04* (2006.01)

(52) U.S. Cl.
CPC ........... *F16M 11/041* (2013.01); *F16M 11/16* (2013.01); *F16M 13/00* (2013.01); *F16M 13/022* (2013.01); *H04B 1/38* (2013.01); *H04B 1/3877* (2013.01); *H04N 5/225* (2013.01); *H04N 5/2251* (2013.01); *A45F 2200/0516* (2013.01); *H04M 1/04* (2013.01); *Y10T 29/49826* (2015.01); *Y10T 29/49876* (2015.01); *Y10T 29/49998* (2015.01)

(58) Field of Classification Search
CPC .... F16M 13/022; F16M 13/00; H04N 5/2251; H04N 5/225; A45F 3/44; H04B 1/3877; H04B 1/38; Y10T 29/49876; Y10T 29/49998; Y10T 29/4982
See application file for complete search history.

(56) References Cited

U.S. PATENT DOCUMENTS

| | | |
|---|---|---|
| D669,065 S | 10/2012 | Fromm |
| 8,469,325 B2 * | 6/2013 | Yu .......................... G10G 5/005 248/231.51 |
| D693,892 S | 11/2013 | Bentley et al. |
| D706,785 S | 6/2014 | Brittain et al. |
| D716,215 S | 10/2014 | Dunn |
| D719,159 S | 12/2014 | Nguyen |
| 8,926,460 B2 * | 1/2015 | Kurematsu ........... F16H 7/0848 411/518 |
| 2008/0107413 A1 | 5/2008 | Moore et al. |
| 2008/0226284 A1 | 9/2008 | Coppola |
| 2008/0234013 A1 | 9/2008 | Bury |
| 2011/0091195 A1 | 4/2011 | Goldberg et al. |
| 2011/0148352 A1 | 6/2011 | Wang et al. |
| 2014/0209777 A1 | 7/2014 | Klemin et al. |

* cited by examiner

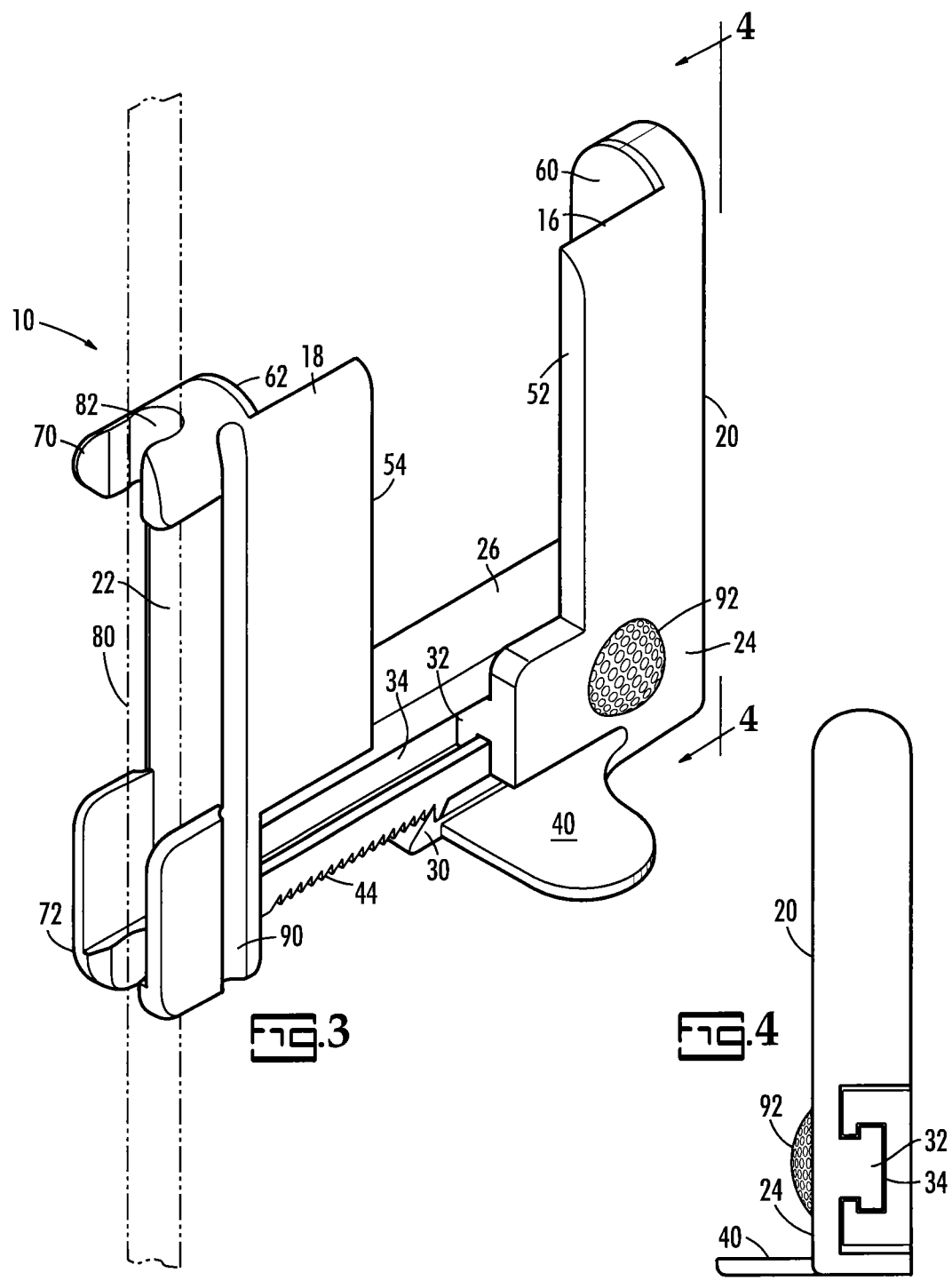

METHOD AND DEVICE FOR ELEVATING MOBILE DEVICE

CROSS REFERENCE TO RELATED APPLICATIONS

The present application claims the benefit of priority of U.S. Provisional Application No. 61/607,786, filed on Mar. 7, 2012, which is incorporated herein in its entirety.

BACKGROUND OF THE INVENTION

The present invention relates generally to supports for elevating electronic mobile devices, including video recorders.

Sporting and recreational activities are often filmed or recorded with various devices. Unless one has the assistance of another person in the recording process, devices must be employed to fix and elevate a camera to the proper location to capture the scene or shot.

While various devices may serve the purpose of propping a video recorder at an appropriate distance and location from what is being filmed, these oftentimes can be cumbersome, heavy or inconvenient for the user. Thus, these devices are typically only used when there is a special need or a prescheduled event requiring filming. Having a more compact and convenient device that provides for filming, and particularly, filming in a spontaneous manner is desirable.

Accordingly, there is a need for a convenient support to capture video footage from a desired location.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

The present invention includes a method and device for holding an electronic device, such as a suitably-equipped cellular phone, having a video recording feature, or simply a camera, at a desired elevation for filming or photographing.

The device includes a frame for holding the electronic device and a vertical support serving as a monopod, such as a golf alignment stick. The frame may be a two-part adjustable frame comprising two interlocking, opposing, L-shaped elements. In such an embodiment, each element has a vertical portion and a horizontal portion. The horizontal portions of the two elements engage each other and lock.

In operation, the first element of the frame moves with respect to the second element of the frame, and, as it moves, changes the separation distance between the vertical portions of the two elements to a desired separation distance that accommodates the width of the particular video recorder to be used. Adjustment of the separation distance is accomplished by engaging a lock system that may include a lever on one of the two frame elements that is holds the other of the two frame elements at a desired distance from the first element.

The elevation of the frame may be adjusted through the use of a vertical support that can engage one of the two frame elements. In one embodiment, one frame element includes clips to snap onto the vertical support. The clips and the vertical support are complementary in shape so as to form a snug, snap fit. As used herein, "snap fit" can refer to any friction, force, or swage fit that is achieved by pressing or forcing a male member into a corresponding female member and that does not permanently connect or attach the members.

The present invention further includes a method for holding and elevating an electronic device for the purpose of recording an event. The method may comprise the steps of: 1) providing a holding frame having a first and second element that interlock; 2) providing a recording device having a width; 3) adjusting the holding frame so that the distance between the first and second elements is greater than the width of the electronic device; 4) placing the recording device between the first and second elements; 5) adjusting the holding frame so that the distance between the first and second elements is such that the recording device is held firmly in place; 6) placing a vertical support in the ground; and 6) connecting the holding frame to a vertical support at a desired elevation.

A feature of the present invention is the use of an adjustable frame, which effectively holds a recording device and that is also stream lined to avoid obscuring the recording, and light weight for convenient storage and transport by the user.

Another feature of the present invention is the use of a frame that cooperates with a vertical support that serves as a monopod to adjust the frame at a desired height.

Other features and their advantages will be readily apparent to those skilled in the arts, techniques and equipment relevant to the present invention from a careful reading of the Detailed Description of Preferred Embodiments, accompanied by the following drawings.

BRIEF DESCRIPTION OF THE DRAWINGS

FIG. 3 includes a perspective view of an embodiment of the holding device according to the present invention; and FIG. 4 includes a side elevation view of an embodiment of the holding device according to the present invention.

DETAILED DISCLOSURE OF THE PREFERRED EMBODIMENT

The present invention includes a method and device for holding an electronic device, such as a suitably-equipped cellular phone, having a video recording feature, or simply a camera, at a desired elevation for filming or photographing.

Figure 1:
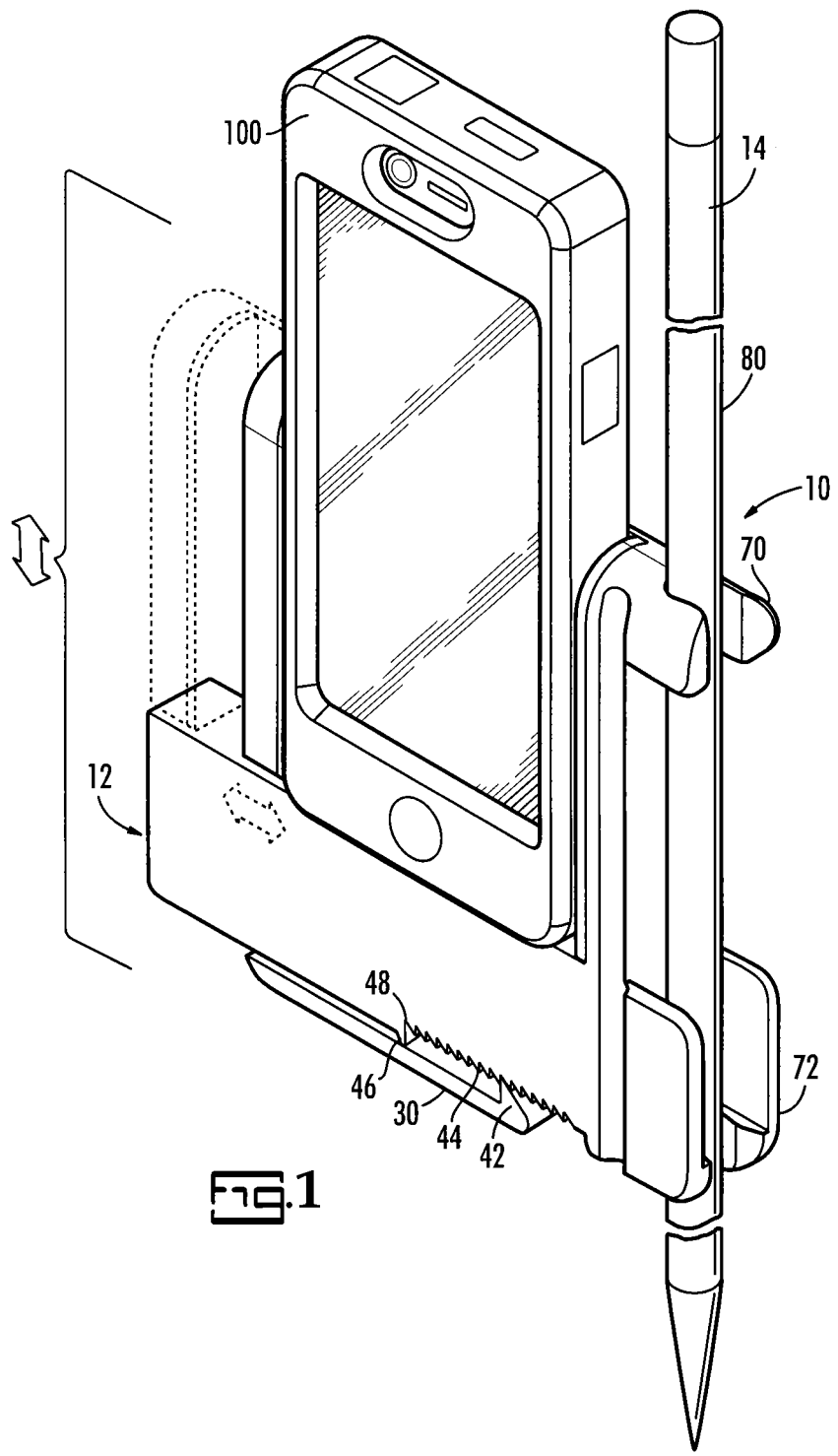
FIG. 1 includes a perspective view of an embodiment of the holding device according to the present invention.
Figure 2A:
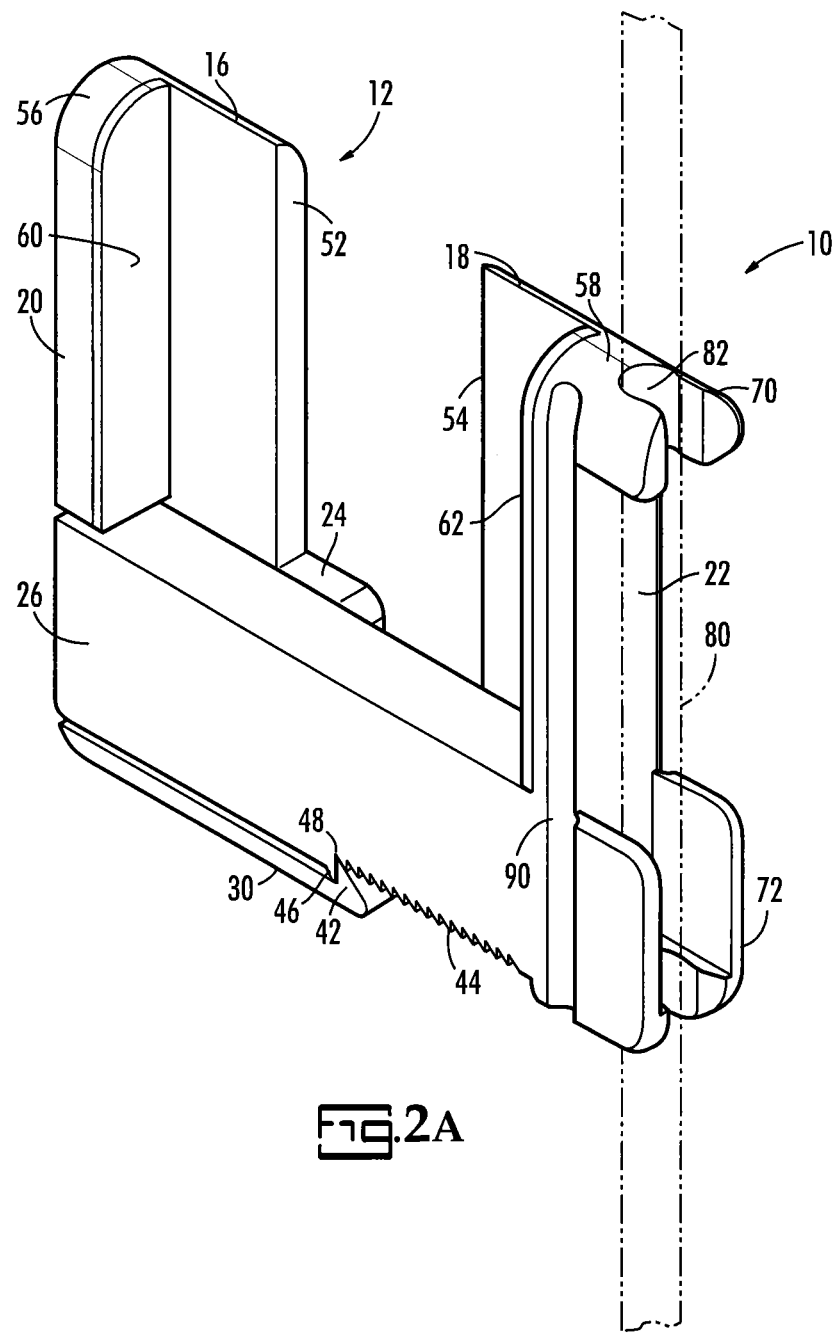
FIG. 2A includes a perspective view of an embodiment of the holding device according to the present invention.
Figure 2B:
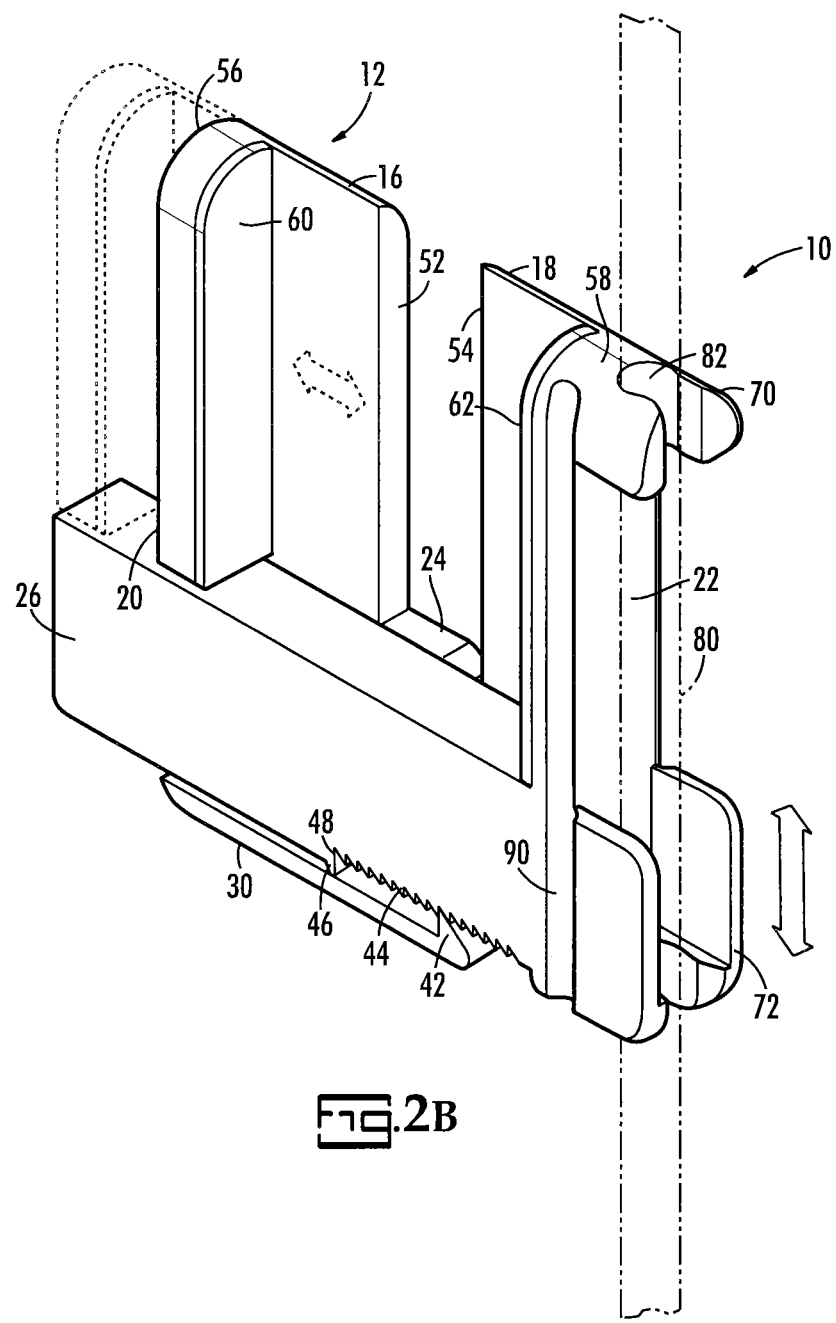
FIG. 2B includes a perspective view of an embodiment of the holding device according to the present invention.

Referring now to the figures, FIGS. 1-4 depict an embodiment of the present invention. The device 10 includes a frame 12 for holding an electronic device 100 and a vertical support 14 serving as a monopod.

The electronic device 100 may be any suitably equipped cellular telephone, or so-called smart phone, or other device with a recording feature that is generally rectangular or square in shape, or that generally has a width and a length, even if possessing rounded edges. Such devices commonly have dimensions ranging from about 100 to 150 mm by about 50 to 70 mm by about 8 to 13 mm in length, width and depth, with other dimensions possible.

The frame 12 may be a two-part adjustable frame comprising a first and a second frame element, 16 and 18, that are interlocking, opposing, and generally L-shaped. In such an embodiment, each element, 16 and 18, has a vertical portion, 20 and 22, and a horizontal portion, 24 and 26. The horizontal portions, 24 and 26, of the two elements engage each other and lock. Additionally, the horizontal portions, 24 and 26, are slidable with respect to each other.

In one embodiment shown best in FIG. 4, the horizontal portion 24 of the first frame element 16 may comprise a male sliding member 32 that is coupled to and received by a female sliding member 34. These sliding members, 32 and 34, complement each other in shape and dimension, and allow for movement between frame elements 16 and 18 along the horizontal axis of these elements, while still maintaining them engaged with respect to other axes. For example, the male sliding member 32 may have T-shaped in cross-section, whereas the female sliding member 34 may have a corresponding T-shaped groove that is dimensioned to receive the male sliding member 32 in a manner that allows for lateral movement, but that limits or prevents movement in other directions.

In operation, the first element 16 of the frame moves with respect to the second element 18 of the frame, and, as it moves, changes the separation distance between the vertical portions, 20 and 22, of the two elements to a desired separation distance that accommodates the width of the particular video recorder 100 to be used.

Adjustment of the separation distance may be accomplished by pressing on a resilient lever 30 integral to or monolithic with the horizontal portion 24 of the first, and slidable, element 16 of the two-part frame, and then sliding the horizontal portion 24 with respect to the second, immovable, horizontal portion 26 of the two-part frame 12. The lever 30 on the first element 24 may be engaged by a tab 40 connected to and extending out from the lever 30. The tab 40 is dimensioned for convenient pressing of the lever 30. For example, the tab 40 may have a surface that is dimensioned to support the end of a human finger for the pressing of the lever.

Furthermore, the lever 30 may carry a tooth 42 that engages, when it is not being pressed, one of a series of parallel grooves 44, carried on the second element 18 and thereby secures the two elements, 16 and 18, in position until the user next presses the lever 30 to disengage the tooth 42 from the particular groove it has been in so that the first element 16 can be moved with respect to the second element 18 and thereby change the separation distance between the vertical portions, 20 and 22, of the two elements.

In one embodiment, the series of parallel grooves 44 includes a first groove 48 having a first wedge-like protrusion 46 that extends out from the bottom surface of the horizontal portion 26 of the second frame element 18, and is generally longer than the adjacent protrusions formed by the series of parallel grooves 44. The wedge 46 is generally V-shaped and serves to engage and stop the lever tooth 42 from moving beyond it unless the lever 30 is forced below and around the wedge 46 by the user.

The vertical portions, 20 and 24, are sized and shaped to both support the video recorder and yet also to allow the lens on the video recorder to not be obstructed when the recorder is in position on the device. For example, many so-called smart phones have recording capabilities that includes a lens near the upper end of the back of the phone. To accommodate these types of phones, the vertical members, 20 and 24, of the present device 10 may provide lateral support from two sides for the smart phone 100, but may be shorter than the smart phone so that the lens is above them.

Alternatively, if the smart phone 100 includes a camera that is not affected by the height of the vertical elements, 20 and 24, these elements may be at a height that provides sufficient lateral support and still enables the user to easily grasp the sides of the smart phone 100 for installation and removal from the frame 12.

Additionally, each of the vertical elements, 20 and 24, may further include a rear wall portion, 52 and 54, that is about perpendicular to a side wall portion, 56 and 58. These walls form corners that receive the corresponding corners of the smart phone device 100, and provide for rear support in addition to lateral support.

The two elements may also include resilient strips, 60 and 62, on their vertical members, 20 and 22, where they engage the video recorder 100 to protect the latter from scratches and from inadvertently pressing buttons that may be on the recorder's sides. The materials for the strips, 60 and 62, may include foamed materials, such as foamed rubber, that are sponge-like and non-abrasive to materials typically employed in the construction of video recording devices, such as smart phones.

The vertical support 14 may be engageable by the second element 18 of two-part frame 12. In one embodiment, the second element 18 of may have integrally formed, resilient clips, 70 and 72, to snap onto a thin, cylindrical support 80, such as an alignment stick as is often used by golfers to obtain a sense of the variations in the surface of a golfing green. Alternatively, a single clip may be used, or more than two clips may be used. In the embodiment shown in the figures, the use of a first upper clip 70 and a second lower clip 72 may facilitate the insertion and removal of the alignment stick 80 by providing open space there between.

The alignment stick 80 can be pressed into the ground at a depth sufficient to hold it vertically, and then the present device 10, with a video recorder in position between the first and second elements, 16 and 18, is snapped onto the alignment stick 80 at a suitable elevation. The video recorder is then in position to capture images without being held, the alignment stick 40 serving essentially as a monopod.

The shape and dimension of the clips 70 and 72 complement the shape and dimension of the vertical support 14. For example, if the vertical support is rod-like, such as a golf alignment stick, the clips on the frame include a rounded cavity 82 to receive the stick and to form a snug fit. For example, the clips 70 and 72 may resemble a horse-shoe design having an open side and a rounded closed side.

Optionally, the edges at the insertion area or open side of the clips, 70 and 72, may be beveled to facilitate the insertion and snapping together with the vertical support 14. Additionally, the vertical portion 22 of the second element 18 may include a vertical groove 90 on either or both sides of the vertical portion 22 and adjacent to the clips 70 and 72. The groove 90 may extend the length of the vertical portion 22 and can serve to facilitate the snapping of the vertical support 14 by increasing the flexibility or resilience of the clips 70 and 72.

Another option for the holding device includes a gripping mound 92, shown in FIGS. 3-4, on the horizontal portion 24 of the first element 16, which may facilitate the adjustment of the frame element with relation to the other frame element 18. Alternatively, the surface of the holding device can be relatively flat and smooth.

The materials employed for the two-part frame may include any suitable material for this type of construction, include a plastic material. Preferably, the material is sturdy, yet light-weight and resilient enough to enable the pressing and clipping actions required to operate the device. Additionally, the features described as forming part of one or the other of the two frame elements may be monolithic, or form part of a single piece, respectively.

The present invention further includes a method for holding and elevating an electronic device for the purpose of recording an event. The method may comprise the steps of: 1) providing a holding frame having a first and second element that interlock; 2) providing an electronic recording device having a width; 3) adjusting the holding frame so that the distance between the first and second elements is greater than the width of the recording device; 4) placing the recording device between the first and second elements; 5) adjusting the holding frame so that the distance between the first and second elements is such that the recording device is held firmly in place; 6) placing a vertical support in the ground; and 6) connecting the holding frame to a vertical support at a desired elevation.

Those skilled in the relevant arts will appreciate from the foregoing description of preferred embodiments that substitutions and modification can be made without departing from the spirit and scope of the invention which is defined by the appended claims.

What is claimed is:

1. A device for holding a video recorder at a desired elevation, comprising:
    a vertical support for elevating a holding frame,
    the holding frame having a first element that interlocks with a second element through a lever system, wherein the second element remains stationary with respect to the vertical support, wherein each of said first and second elements includes a vertical portion and a horizontal portion, and wherein said first element is movable with respect to said vertical support such that a separation distance between said vertical portions of said first and second elements accommodates a width of the video recorder being used; and
    wherein said holding frame and said vertical support are releasably connected.

2. The device as recited in claim 1, wherein each of said first and second elements are L-shaped.

3. The device as recited in claim 1, wherein said horizontal portion of said first element includes a lever carrying a tooth.

4. The device as recited in claim 3, wherein said horizontal portion of said second element carries a series of parallel groves, and wherein said tooth engages one of said series of parallel grooves when said lever is not being pressed.

5. The device as recited in claim 4, wherein said series of parallel grooves includes a first wedge that extends out from the bottom surface of said horizontal portion of said second element, and wherein said first wedge restricts the lateral movement of said tooth.

6. The device as recited in claim 3, wherein said lever is connected to a tab that extends out from said lever, and wherein said tab has a surface area that is dimensioned to support an end of a human finger for the pressing of said lever.

7. The device as recited in claim 1, wherein said vertical portion of said second element includes a first resilient clip.

8. The device as recited in claim 7, wherein said vertical support is an alignment stick that is dimensioned for insertion into and snap fit with said first resilient clip.

9. The device as recited in claim 7, wherein said vertical portion of said second element includes a second resilient clip, said alignment stick being dimensioned for insertion into and snap fit with said second resilient clip.

10. The device as recited in claim 9, wherein said first resilient clip and said second resilient slip are spaced sufficiently apart to allow for grasping of said vertical support.

11. The device as recited in claim 9, wherein each of said first and second resilient clips includes beveled edges.

12. The device as recited in claim 9, wherein said vertical portion of said second element includes a first vertical groove adjacent to said first and second clips.

13. The device as recited in claim 12, wherein said vertical portion of said second element includes a second vertical groove on an opposing side of said vertical portion and adjacent to said first and second clips.

14. The device as recited in claim 1, wherein each of said vertical portions of said first and second elements includes a side wall that is about perpendicular to a rear wall.

15. The device as recited in claim 14, wherein each of said side walls includes a resilient strip.

16. The device as recited in claim 1, wherein said horizontal portion of said first element is coupled to said horizontal portion of said second element through corresponding male and female members, respectively.

17. A device for holding a video recorder at a desired elevation, comprising:
    a holding frame having a first element that interlocks with a second element through a lever system, wherein each of said first and second elements includes a vertical portion and a horizontal portion, and wherein said first element is moveable such that a separation distance between said vertical portions of said first and second elements accommodates a width of the video recorder being used, wherein said horizontal portion of said first element directly interacts with the horizontal portion of said second element such that relative motion therebetween can be inhibited at fixed, spaced intervals via interlocking features on the respective horizontal portions in order to fix said separation distance.

18. The device as recited in claim 17, further comprising a vertical support, wherein said holding frame and said vertical support are releasably connected by a snap fit, and wherein said lever system comprises:
    a lever carrying a tooth that is integral with said horizontal portion of said first element; and
    a series of parallel grooves integral with said horizontal portion of said second element, wherein said tooth engages one of said series of parallel grooves when said lever is not being pressed.

19. The device as recited in claim 17, wherein said horizontal portion of said first element includes an integral lever carrying a tooth and said horizontal portion of said second element has a series of parallel grooves that are engageable by said tooth.

20. The device as recited in claim 17, wherein said horizontal portion of said first element is coupled to said horizontal portion of said second element through corresponding male and female sliding members, respectively.

21. The device as recited in claim 20, wherein the male sliding member comprises a T-shaped cross-section.

22. The device as recited in claim 20, wherein the female sliding member comprises a T-shaped groove dimensioned to receive the male sliding member.

23. The device as recited in claim 19, wherein the series of parallel grooves includes a first groove having a first wedge-like protrusion that extends out from the bottom surface of the horizontal portion of the second element.

24. The device as recited in claim 23, wherein the first groove is longer than adjacent protrusions formed by the series of parallel grooves, wherein said first wedge restricts the lateral movement of said tooth.

25. The device as recited in claim 17, wherein the first element comprises a gripping mound.

26. A method for holding a video recorder at a desired elevation, comprising the steps of:
providing a vertical support;
providing a holding frame having a first element interlocked with a second element through a lever system, wherein the second element remains stationary with respect to said vertical support, wherein each of said first and second elements includes a vertical portion and a horizontal portion, wherein said first element is movable with respect to said vertical support such that a separation distance between said vertical portions of said first and second elements can be adjusted; and wherein one of said first and second elements have a clip;
providing a video recorder having a width;
placing said video recorder between said vertical portions;
adjusting the separation distance between said vertical portions, wherein the separation distances provides for a secure hold on said video recorder;
fixing said vertical support into the ground; and
snapping said holding frame onto said vertical support at a desired elevation.

27. The method as recited in claim 26, wherein said horizontal portion of said first element includes an integral lever carrying a tooth, wherein said second element has a series of parallel grooves that are engageable by said tooth, and wherein said adjusting of the separation distance between said vertical portions is done by pressing on said lever, moving said first element laterally along said series of parallel grooves, and engaging said tooth of said lever with one of said series of parallel grooves located at a desired separation distance.

* * * * *